(12) United States Patent
Kaneda et al.

(10) Patent No.: US 7,089,359 B2
(45) Date of Patent: Aug. 8, 2006

(54) MANAGEMENT OF HIERARCHICALLY CONFIGURED STORAGE

(75) Inventors: Yasunori Kaneda, Sagamihara (JP); Daisuke Shinohara, Yokohama (JP); Takahiro Fujita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 39 days.

(21) Appl. No.: 10/786,108

(22) Filed: Feb. 26, 2004

(65) Prior Publication Data
US 2005/0086431 A1   Apr. 21, 2005

(30) Foreign Application Priority Data
Oct. 21, 2003   (JP) .............................. 2003-360332

(51) Int. Cl.
*G06F 12/08*   (2006.01)
(52) U.S. Cl. ....................................... 711/117; 711/202
(58) Field of Classification Search .................... 711/6, 711/117–119, 112, 113, 122; 707/205
See application file for complete search history.

(56) References Cited

U.S. PATENT DOCUMENTS

| | | | |
|---|---|---|---|
| 4,310,883 A * | 1/1982 | Clifton et al. ............... | 707/205 |
| 5,651,133 A | 7/1997 | Burkes et al. | |
| 5,666,512 A | 9/1997 | Nelson et al. | |
| 6,457,101 B1 | 9/2002 | Bauman et al. | |
| 6,681,310 B1 * | 1/2004 | Kusters et al. .............. | 711/202 |
| 6,779,078 B1 | 8/2004 | Murotani et al. | |
| 2002/0002656 A1 | 1/2002 | Honma et al. | |
| 2004/0098547 A1 * | 5/2004 | Ofek et al. .................. | 711/162 |
| 2004/0250033 A1 * | 12/2004 | Prahlad et al. .............. | 711/162 |

FOREIGN PATENT DOCUMENTS

| | | |
|---|---|---|
| JP | 2000163298 | 6/2000 |
| WO | WO97/09676 | 3/1997 |

OTHER PUBLICATIONS

SMI-S Specification Public Review Draft ( pp. 103-114, pp. 146-182), Storage Networking Industry Association (SNIA), 2003.

* cited by examiner

*Primary Examiner*—Donald Sparks
*Assistant Examiner*—Jared Rutz
(74) *Attorney, Agent, or Firm*—Mattingly, Stanger, Malur & Brundidge, P.C.

(57) ABSTRACT

In a computer system having a storage system in which storage units are hierarchically configured, a management method for accurately grasping the capacity available to the computer is disclosed.

In a computer system in which a management computer manages the capacities of storage units for storing data used by the computer, the management method is typically realized by a storage management system comprising a group of first-level storage units each containing volumes for storing data used by the computer, a group of second-level storage units each of which is hierarchically linked to, and physically connected through a communication path to, one of the first-level storage units and contains volumes for storing data used by the computer, a means for collecting volume information from the first-level and the second-level storage units, a means for collecting inter-volume hierarchy information, and a means for calculating the total effective capacity to the computer based on the volume information and the inter-volume information thus collected.

24 Claims, 9 Drawing Sheets

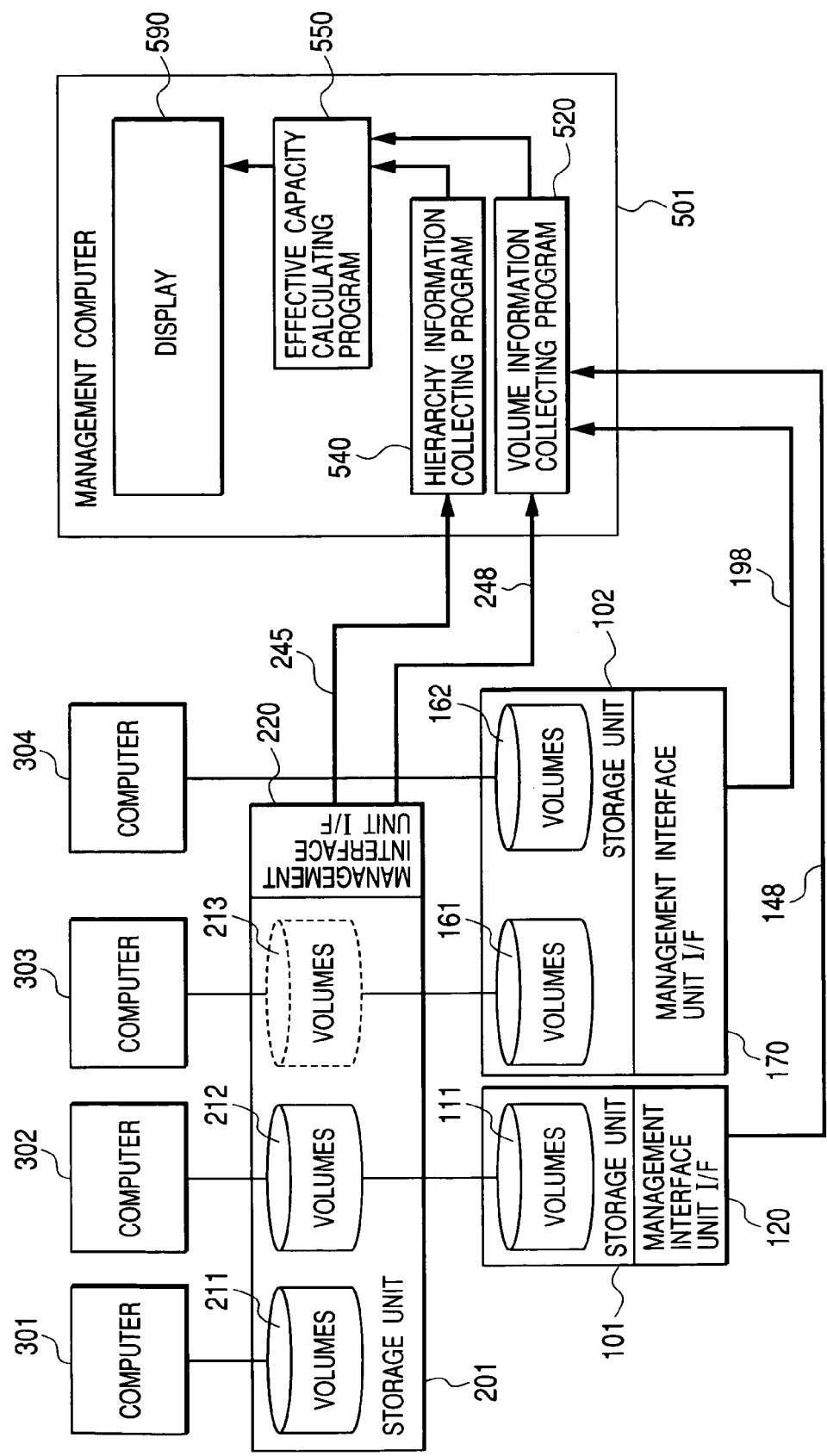

| TOTAL NO. OF VOLUMES | IDENTIFIER | CAPACITY |
|---|---|---|
| 3 | ABC.XX200.0123.211 | 100GB |
|  | ABC.XX200.0123.212 | 100GB |
|  | ABC.XX200.0123.213 | 100GB |

| TOTAL NO. OF VOLUMES | IDENTIFIER | CAPACITY |
|---|---|---|
| 1 | DEF.YY100.0456.111 | 100GB |

| TOTAL NO. OF VOLUMES | IDENTIFIER | CAPACITY |
|---|---|---|
| 2 | GHI.ZZ100.0789.161 | 100GB |
|  | GHI.ZZ100.0789.162 | 100GB |

| IDENTIFIER OF UPPER-LEVEL VOLUME | IDENTIFIER OF LOWER-LEVEL VOLUME |
|---|---|
| ABC.XX200.0123.212 | DEF.YY100.0456.111 |
| ABC.XX200.0123.213 | GHI.ZZ100.0789.161 |

| TOTAL NUMBER OF VOLUMES | IDENTIFIER | CAPACITY | LOWER VOLUME FLAG | IDENTIFIER | CAPACITY |
|---|---|---|---|---|---|
| 3 | ABC.XX200.0123.211 | 100GB | 0 | | |
| | ABC.XX200.0123.212 | 100GB | 1 | DEF.YY100.0456.111 | 100GB |
| | ABC.XX200.0123.213 | 100GB | 2 | GHI.ZZ100.0789.161 | 100GB |

US 7,089,359 B2

MANAGEMENT OF HIERARCHICALLY CONFIGURED STORAGE

BACKGROUND OF THE INVENTION

The present invention relates to a storage management method, and more specifically to a method for managing the capacities of volumes contained in storage units in a computer system having a hierarchically arranged group of storage units.

DESCRIPTION OF THE PRIOR ART

In a large-scale storage system such as a disk array system, each storage unit is divided into a number of virtual storage areas called volumes. Stored in each such volume are programs to be executed by the computer to which the storage unit is connected and their associated data that is necessary for executing them. The information concerning the volumes such as the number of volumes allocated to each storage unit and the capacity of each volume (typically expressed in bytes) can be obtained through the management interface to which the storage units are connected.

Another system according to the prior art allows a volume with a desired capacity to be created in a storage unit through a management interface. For example, the Storage Networking Industry Association (SNIA; http://www.snia.org) is working on the establishment of a storage management interface based on the Common Information Model (CIM) and Web-Based Enterprise Management (WBEM), the standardization of which is being promoted by the Distributed Management Taskforce (DMTF). More specifically, SNIA has published the Storage Management Initiative Specification (SMI-S), which sets forth a set of specifications for how to check the capacity of a given volume in a given storage unit and for how to create a volume in a given storage unit.

Furthermore, Publication of Japanese translation of a PCT application Heisei 10-508967 (WO97/09676) (reference #1) discloses a storage system which allows online data transfer between two storage units that are situated in different levels of storage hierarchy.

[Reference #1]

Publication of Japanese translation of a PCT application Heisei 10-508967 (WO97/09676)

[Reference #2]

SMI-S Specification PUBLIC REVIEW DRAFT (pp. 103–114, pp. 146–182) [online], Storage Networking Industry Association (SNIA), Apr. 15, 2003 (accessed on Jun. 4, 2003) (Internet URL:

http://www.snia.org/smi/tech activities/smi_spec_pr/spec/SMIS_1615a.pd f)

SUMMARY OF THE INVENTION

The invention disclosed in Publication of Japanese translation of a PCT application Heisei 10-508967, assuming that a first-level storage unit and a second-level storage unit belonging to different levels of hierarchy support a management interface of the type described above, allows a management computer having the same management interface to detect, and communicate with, both of these storage units through a network. For example, by interrogating any storage unit, the management computer can obtain the number of volumes contained in it or information on the capacities of the volumes contained in it.

In a configuration where a second-level storage unit is hierarchically connected to a first-level storage unit, data migration involves making a volume in the second-level storage unit available for use as a volume in the first-level storage unit. The management computer then needs to realize that certain volumes in the second-level storage unit are in fact used as volumes belonging to the first-level storage unit and also to know the total effective capacity in the system.

It is an object of the present invention to provide, in a storage system in which storage units are hierarchically configured into multiple levels, a storage management system and a storage management method for realizing the hierarchical structure of the storage units and accurately grasping and displaying the total available storage capacity.

In a computer system comprising a computer, a plurality of storage units each containing one or more volumes for storing data used by the computer, and a management computer for managing the status of the storage units, the invention relates to a storage management system comprising one or more first-level storage units each containing one or more volumes for storing data used by the computer, one or more second-level storage units each of which is connected to one of the first-level storage units through a communication path in a hierarchical configuration and contains one or more volumes for storing data used by the computer, means for collecting from the first and the second-level storage units volume information on the volumes contained in them, means for collecting inter-volume hierarchy information on the hierarchical relationships between volumes contained in the first storage units and volumes contained in the second-level storage units, and means for calculating the total effective capacity to the computer based on the volume information and the inter-volume hierarchy information thus collected.

In a preferred embodiment of the invention, the first and the second-level storage units each contain one or more virtual storage areas called volumes. The means for collecting volume information, the means for collecting inter-volume hierarchy information, and the means for calculating the total effective capacity are all provided by each program, which is executed in the management computer.

In the preferred embodiment, the information on the hierarchical relationships between the volumes contained in a first-level storage unit and the volumes contained in a second-level storage unit is held in the first-level storage unit, which is the higher in the hierarchy. This is accomplished, for example, by providing each first-level storage unit with a program for processing hierarchy information requests, which collects information from the storage units connected to it.

The management computer is equipped with a display unit (hereinafter simply called "display") to display the storage capacities of the volumes contained in each storage unit and the inter-volume hierarchical relationships. In the preferred embodiment, the display has at least two display sections: one for displaying the information on the volumes contained in the second-level storage units that are used by the first-level storage units, and the other for displaying the information on the other volumes.

The process of managing the storage capacities of volumes using the management computer according to the preferred embodiment of the invention comprises a step for allocating a volume in a first-level storage unit for storing data used by the computer, a step for establishing a hierarchical relationship between a first-level storage unit and a second-level storage unit so that a volume is shared between the two, a step for collecting information on the volumes contained in the first-level storage units, a step for collecting information on the volumes contained in the second-level storage units, a step for collecting information on the hierarchical relationships between the volumes in the first-level storage units and those in the second-level storage units, and a step for calculating the total effective capacity in the computer system based on the information on the volumes and the information on the hierarchical relationships thus collected. This process is carried out by a program for managing the storage capacities of the volumes running on the management computer.

The invention makes it possible to accurately grasp, in a computer system having a hierarchically arranged group of storage units, the storage capacity available to the computer. Furthermore, it displays on the display of the management computer information on the real capacities of the volumes considering the hierarchical relationships between them, thereby providing the user with accurate information on the capacities of the volumes that are hierarchically configured.

BRIEF DESCRIPTION OF THE DRAWINGS

FIG. 1 illustrates the general configuration of a computer system according to a preferred embodiment of the invention.

FIG. 2 shows the format of volume information according to a preferred embodiment.

FIG. 3 shows the format of information on the hierarchical relationship according to a preferred embodiment.

DESCRIPTION OF THE PREFERRED EMBODIMENTS

Figure 4:
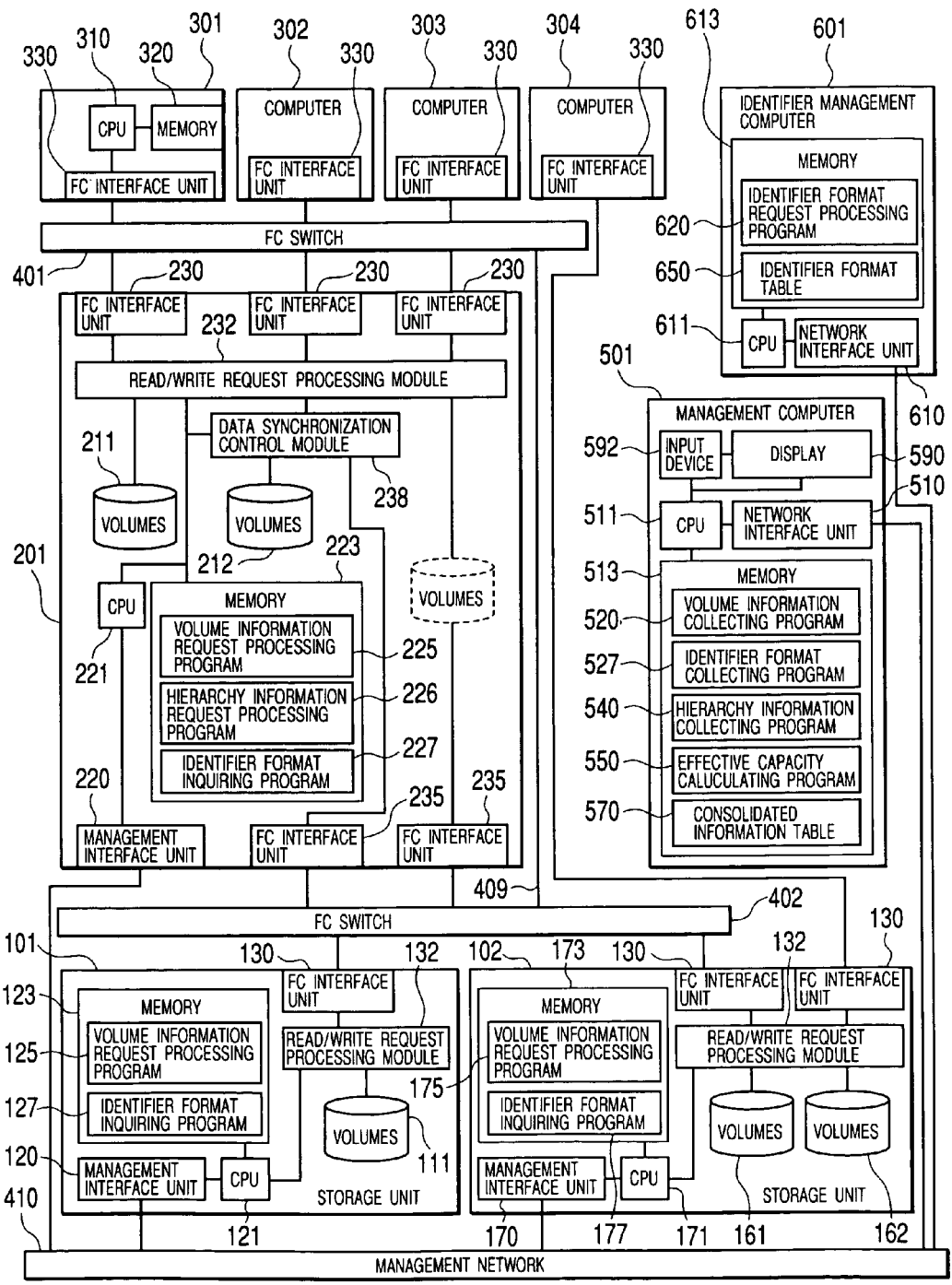
FIG. 4 shows an example of a computer system according to a preferred embodiment.

Preferred embodiments of the invention will now be described by way of example and with reference to the accompanying drawings.

FIG. 1 shows a computer system comprising four computers 301 through 304, a first-level storage unit 201, and two second-level storage units 101 and 102, and a management computer 501. The first-level storage unit 201 and the second-level storage units 101 and 102 each contain at least one virtual storage area called a volume. The second-level storage units 201 and 202 are connected to the first-level storage unit 201 through a communication path in a hierarchical configuration. It should be noted that more than one volume may be allocated within one storage unit or one volume may span more than one storage unit.

The computer 301 is connected to a volume 211, the communication with which is controlled by the first-level storage unit 201. Stored in the volume 211 are programs used by the computer 301, their input data, and their output data. Similarly, the computer 302 is connected to a volume 212, the communication with which is controlled by the first-level storage unit 201. Further, the volume 212 is connected to a volume 111, the communication with which is controlled by the second-level storage unit 101. The volume 212 and the volume 111 are configured hierarchically and each can hold data.

The computer 303 is connected to a volume 213, the communication with which is controlled by the first-level storage unit 201. The volume 213 is connected to a volume 161 situated in the second-level storage unit 102. The volume 213 cannot hold data; instead, the data for the volume 213 is actually held in the volume 161. When the computer 303 sends a write request directed to the volume 213, the first-level storage unit 201 asks the computer 303 to send the write data and, upon receiving it, sends a write request to the volume 161. The second-level storage unit 102 then stores the data into the volume 161. When the computer 303 sends a read request directed to the volume 213, the first-level storage unit 201 passes it to the volume 161. It then obtains the read data through the second-level storage unit 102 to which the volume 161 belongs and passes it to the computer 303. Alternatively, it can be so arranged that the volume 213 represents the volume 161 either for read or for write operation only. In effect, the volume 213 does not exist in the first-level storage unit 201 but instead acts just as a phantom area, and therefore is shown in dotted lines in the diagram. Thus, the volume 161 situated in the second-level storage unit 102 appears to the computer 303 as if it is situated in the first-level storage unit 102.

The computer 304 is connected to the volume 162, the communication with which is controlled by the second-level storage unit 102. Stored in the volume 162 are programs used by the computer 304, their input data, and their output data.

The storage units 201, 101, and 102 are each equipped with a management interface unit (I/F) 220, 120, and 170, respectively, for connection to the management computer 501.

While the configuration and operation of the management computer 501 will be described in detail later with reference to FIG. 4, an overview will be presented here.

In a computer system comprising one or more computers and a hierarchically arranged group of storage units, the management computer 501 is designed to grasp the storage capacity actually available to each computer and for that purpose is equipped with a volume information collecting program 520, a hierarchy information collecting program 540, an effective capacity calculating program 550, and a display 590 for displaying the effective capacities calculated by the effective capacity calculating program 550 for the system administrator.

The volume information collecting program 520 issues volume information requests to the storage units 201, 101, and 102 and obtains information (248, 148, and 198, respectively) on the number of volumes and the capacity of each volume in each storage unit. FIG. 2 shows examples of the volume information.

The hierarchy information collecting program 540 obtains hierarchy information 245 held by the first-level storage unit 201. The effective capacity calculating program 550 calculates, based on the volume information and the hierarchy information thus collected, the effective capacities actually available to the computers 301 through 304.

FIG. 3 shows an example of the format of the hierarchy information obtained through the hierarchy information 245. Each volume is assigned an identifier. For example, the identifier of the upper-level (first-level) volume 212, "ABC.XX200.0123.212," is associated with the identifier of the lower-level (second-level) volume 111, "DEF.YY100.0456.111." This relationship is held in an internal memory (not indicated in the diagram) of the first-level storage unit 201. When there is a change to the hierarchical relationship between a volume in a first-level storage unit and a volume in a second-level storage unit, this hierarchy information is revised accordingly.

Assuming that the volumes 111, 161, 162, 211, 212, and 213 each have a storage capacity of 100 G bytes (hereinafter abbreviated to "GB"), FIG. 2 shows the volume information collected by the management computer 501. (A) represents the volume information 248, which lists all the volumes allocated to the storage unit 201 and which indicates that the total number of volumes is 3 and each volume has a capacity of 100 GB. Similarly, (B) represents the volume information 148 corresponding to the storage unit 101, and (C) represents the volume information 198 corresponding to the storage unit 102.

If the management computer 501 were not to recognize the hierarchical relationships between volumes in the first-level storage units and the second-level storage units, then it would assume, by simply adding up the capacity of each volume, that a total of 600 GB were available in this computer system. The preferred embodiment of the invention described here, however, allows the management computer to calculate the total available capacity considering the hierarchical relationships, thereby preventing such misjudgments. Thus, the management computer 501, realizing that the volume 111 is subordinate to the volume 212 and the volume 161 is subordinate to the volume 213, making the number of real volumes four, calculates the total effective storage capacity to be 400 GB.

FIG. 4 shows an example of the configuration of a computer system according to the preferred embodiment being described.

The computers 301 through 303 are connected to the storage unit 201 through a fibre channel switch (hereinafter abbreviated to "FC switch") 401. Each of the computers 301 through 304 comprises a CPU 310, a memory 320, and a fibre channel interface unit (hereinafter abbreviated to "FC interface unit") 330. The FC interface unit 330 handles the interface operation between the computer and the FC switch. The memory 320 stores programs to be executed by the CPU 310, their input data, and their output data. The storage unit 201 is connected through three FC interface units 230 inside it to the FC switch 401. The storage unit 201 includes a read/write request processing module 232, which receives read/write requests from the computers through the FC interface units 230, reads the requested data from the specified volumes and sends it to the computers, or writes the data sent from the computers to the specified volumes.

The storage unit 201 contains volumes 211 and 212, each having a capacity of 100 GB, for storing data to be used by the computers. The storage unit 201 further contains two FC interface units 235 for connection to other storage units 101 and 102, which serve as lower-level or subordinate storage units. The storage unit 201 also contains a data synchronization control module 238 inserted between the volume 212 and the FC interface unit 235 to establish data synchronization between the volume 212 and the volume 111 which is connected to the volume 212 through the FC interface unit 235. The data synchronization module 238 ensures that data consistency is maintained all the time between the two volumes (in this example, the volume 111 and the volume 212).

The storage unit 201 is also connected to two storage units 101 and 102 through an FC switch 402. Each of the storage units 101 and 102 comprises an FC interface unit 130 for connection to the FC switch 402 and a read/write request processing module 132. Further, the storage unit 101 comprises the volume ill which stores data to be used by the storage unit 201. The storage unit 102 further comprises a volume 161 that stores data to be used by the storage unit 201 and a volume 162 that stores data to be used by the computer 304.

Whereas in the example described here a fibre channel network is assumed for connection between storage units and computers as well as between storage units, different types of network may be used instead, in which case appropriate devices or units need to be installed in place of FC switches and FC interface units. The FC switch 401 and the FC switch 402 may be used separately or may be connected in a cascade configuration.

A description of the management computer 501 and the management interface unit is now in order.

In the computer system depicted in FIG. 4, a management interface unit 410 is provided for grasping the configurations and capacities of the volumes. The storage units 101, 102, and 201 are each equipped with a management interface unit 120, 170, and 220, a CPU 121, 171, and 221, and a memory 123, 173, and 223, respectively. The memories 123, 173, and 223 each store programs to be executed by the CPU, data received through the management interface unit, and data to be sent through the management interface unit.

More specifically, the memory 223 in the storage unit 201 stores a volume information request processing program 225 for processing volume information requests from the management computer 501, a hierarchy information request processing program 226 for processing hierarchy information requests, and an identifier format inquiring program 227 for obtaining an identifier format from an identifier management computer 601 (to be described later).

The memories 123 and 173, which are situated in the storage units 101 and 102, each store a volume information request processing program 125 and 175 for processing volume information requests and an identifier format inquiring program 127 and 177, respectively, for obtaining an identifier format from the identifier management computer 601. The storage units 101 and 102 are connected through a management network 410 to the management computer 501.

The management computer 501 comprises a network interface unit 510 for connection to the management network 410, a CPU 511 for performing information processing inside it, a display 590 for displaying the results of the processing performed by the CPU 511, a memory 513 for storing programs to be executed on the CPU 511, data received or to be sent through the network interface unit 510, and data to be displayed on the display 590, and an input device 592 for receiving instructions from the administrator. Stored in the memory 513 are a volume information collecting program 520 for issuing volume information requests to storage units, a hierarchy information collecting program 540 for issuing hierarchy information requests, an effective capacity calculating program 550 for calculating the effective capacity, and an identifier format collecting program 527 for obtaining an identifier format from the identifier management computer 601.

The above-mentioned programs are originally stored in a nonvolatile storage medium such as a magnetic disk provided inside the management computer 501 and are loaded into the memory 513 for execution each time the management computer is started up. Other types of nonvolatile storage medium such as a CD-ROM and a floppy disk may also be used. Whereas in the example described here these programs are loaded from a nonvolatile storage medium held inside the management computer, they may also be loaded from an outside source through a network.

Next, the function and operation of the identifier management computer 601 will be described.

The computer system further comprises, in addition to a number of storage units, an identifier management computer 601. Each storage unit has an identifier. The identifiers of storage units, however, do not have a standardized format. Each storage unit manufacturer has its own identifier format. The identifier management computer 601 introduces a standardized identifier format, thereby registering and managing all the storage units in the system using a standard format.

It should be noted that if all the storage units have a standardized identifier format, there is no need for an identifier management computer.

The identifier management computer 601 comprises a network interface unit 610 for connecting to the management network 410, a CPU 611 for performing information processing, and a memory 613 for storing programs to be executed by the CPU 611, data received or to be sent through the network interface unit 610, and identifier formats, which are organized and held in an identifier format table 650. Further, the memory 613 stores an identifier format request processing program 620 for processing identifier format requests sent from the storage unit 201, 101, or 102 (hereinafter abbreviated to "201, etc.") or the management computer 501.

When the identifier management computer 601 receives a request (inquiry) for the identifier format from an identifier format inquiring program 227, 127, 177, or 527 (hereinafter abbreviated to "227, etc.") residing in the storage unit 201, 102, or 102 or the management computer 501, the identifier format request processing program 620 returns the identifier format taken from the identifier format table 650 shown in FIG. 5. The identifier format specified by the identifier management computer 601 sets forth the organization of the characters and fields making up the identifier that must be followed by all the storage units in the computer system and the volumes held in them.

Figure 5:
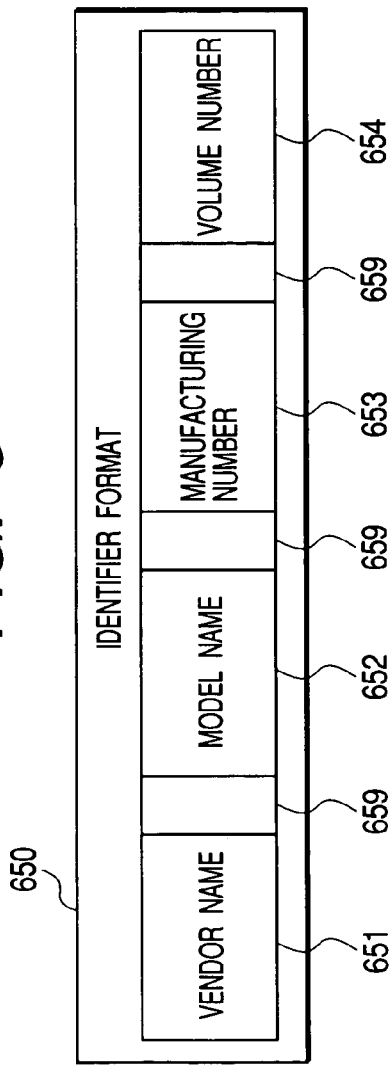
FIG. 5 shows the format of the identifier according to a preferred embodiment.

As shown in FIG. 5, the identifier format 650 comprises a string of characters, which is divided into several fields by delimiters 659 (dot "."). More specifically, it comprises a vendor name 651, a model name 652, a manufacturing number 653, and a volume number 654. As the volume number 654, any of the numbers in the blocks shown in FIG. 1 or FIG. 4 may be used, for example, "ABC.XX200.0123.211." If the identifier format is not standardized, it would be difficult to grasp the total available capacity in the computer system, since the volume information and the hierarchy information obtained from different storage units cannot be compared with each other. Therefore, if the identifier format is not standardized, it would be necessary to equip the management computer 501 with a format conversion program that converts the formats of the identifiers of the volume information and the hierarchy information between different storage units.

The storage unit 201, etc. executes, each time it is started up, the identifier format inquiring program 227, etc. and sends a request for the identifier format to the identifier management computer 601. In response, the identifier management computer 601 sends the identifier format 650 to the storage unit 201, etc. The storage unit 201, etc. saves this identifier format 650 in its internal memory, and later when requested, composes volume information and hierarchy information in accordance with it.

The management computer 501 executes, each time it is started up, the identifier format inquiring program 527 and sends a request for the identifier format to the identifier management computer 601. In response, the identifier management computer 601 sends the identifier format 650 to the management computer 501. The management computer 501 saves this identifier format 650 in its internal memory and later uses it when reading the volume information or hierarchy information sent from the storage unit 201, etc. In this manner, matching in identifier format can be maintained between the storage units 201, etc. and the management computer 501.

Figure 7:
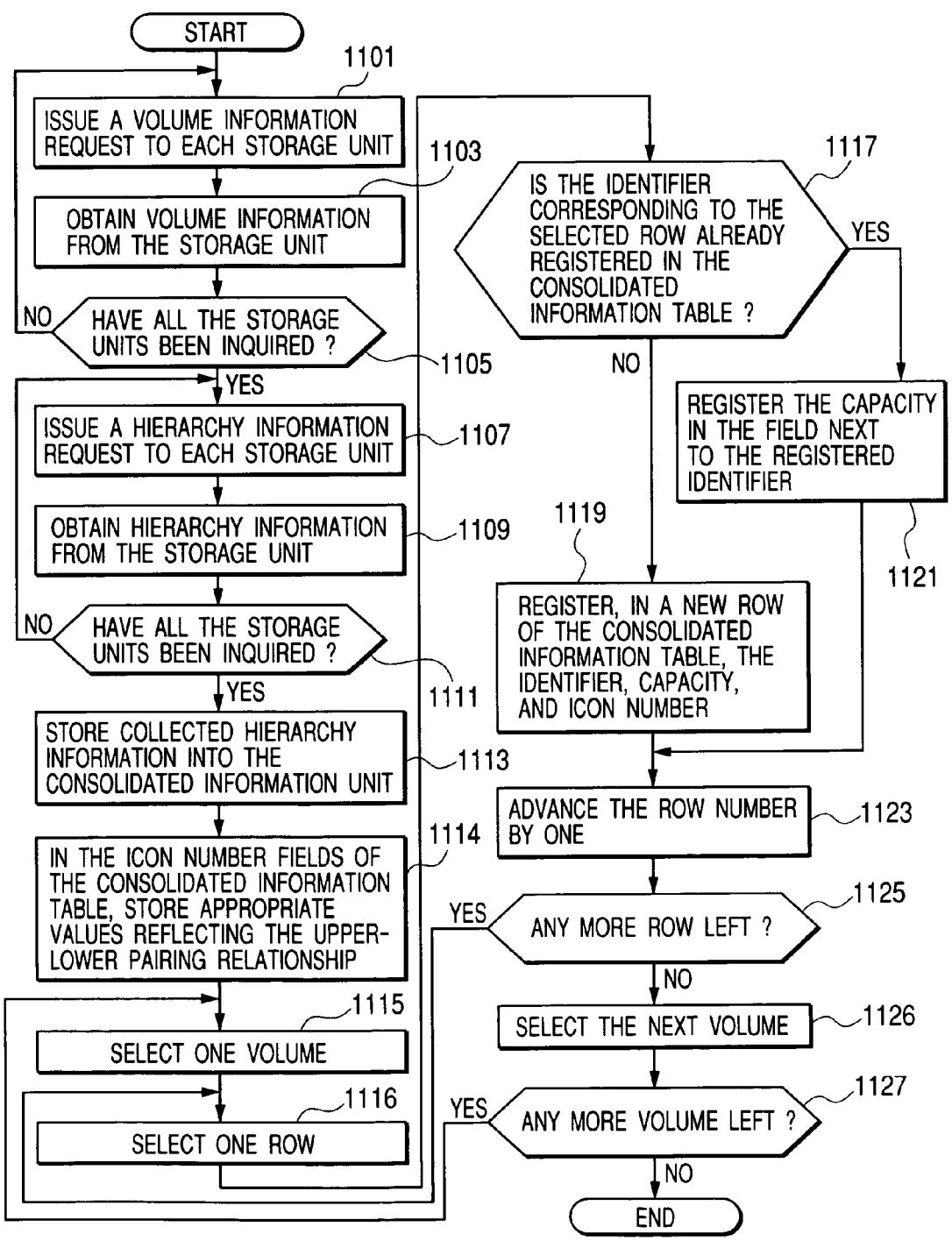
FIG. 7 illustrates the process flow of creating the consolidated information table in a management computer 501 according to a preferred embodiment.
Figure 8:
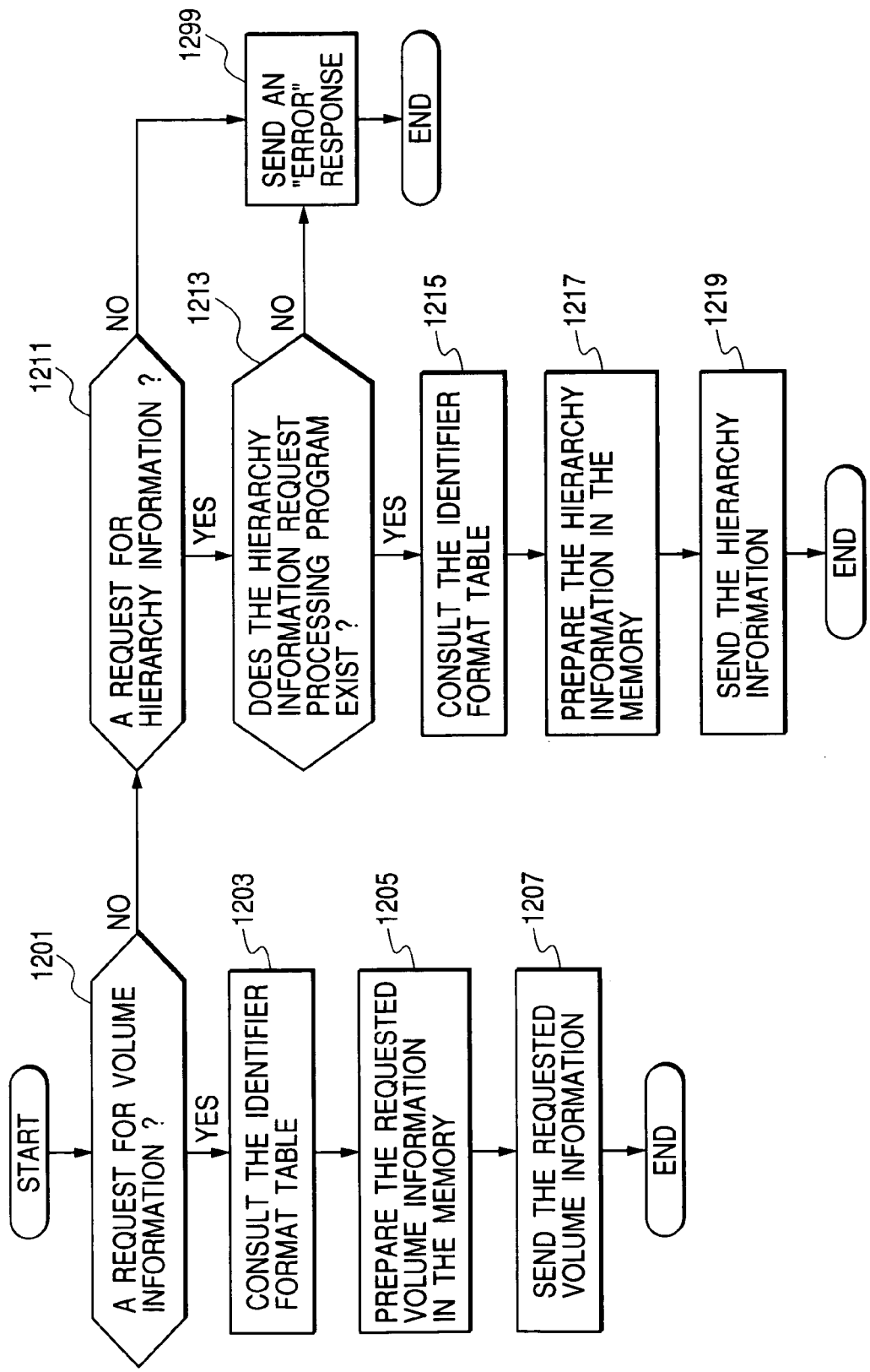
FIG. 8 illustrates the flow of process carried out in the storage unit (e.g., 201) according to a preferred embodiment.

Now, the way the management computer 501 grasps the capacities of the volumes held in the hierarchically configured group of storage units will be described with reference to FIGS. 7 and 8.

When started up, when requested through the input device 592, or when notified by the storage unit 201, etc. of a change to the configuration, the management computer 501 initiates the process of grasping the storage capacities.

First, the CPU 511 in the management computer 501 executes the volume information collecting program 520 and issues a volume information request to every storage unit connected to it (1101).

In the storage unit 201, 101, or 102, the CPU 221, 121, or 171 receives this request, recognizes the type of the request (1201), executes the volume information request processing program 225, 125, or 175, consults the identifier format table 650 stored in the memory 223, 123, or 173 (1203), prepares the requested volume information in the memory (1205), and finally sends it to the management computer 501 (1207).

The management computer 501 thus collects the volume information 248, 148, and 198 shown in FIG. 2 from the storage units 201, 101, and 102, respectively (1103, 1105).

In this case, although the storage unit 201 has only two volumes 211 and 212, it responds to the request from the management computer 501 as if it also owns the volumes that are not contained in it but that are connected to it through the FC interface unit 235.

Next, the CPU 511 in the management computer 501 executes the hierarchy information collecting program 540 and sends a hierarchy information request to every storage unit connected to it (1107). In the storage unit, the CPU receives this request, recognizes the type of the request (1211), executes the hierarchy information request processing program, consults the identifier format table 650 stored in the memory (1215), prepares the hierarchy information in the memory (1217), and finally sends it to the management computer 501 (1219).

Since the storage unit 201 has the hierarchy information request processing program 226 (1213), it can process this request properly. Thus, the management computer receives the hierarchy information 245 shown in FIG. 3 (1109, 1111). On the other hand, the storage units 101 and 102, which do not have the hierarchy information request processing program 226 (1213), their CPUs 121 and 171 send an "error" response (1299).

Figure 6:
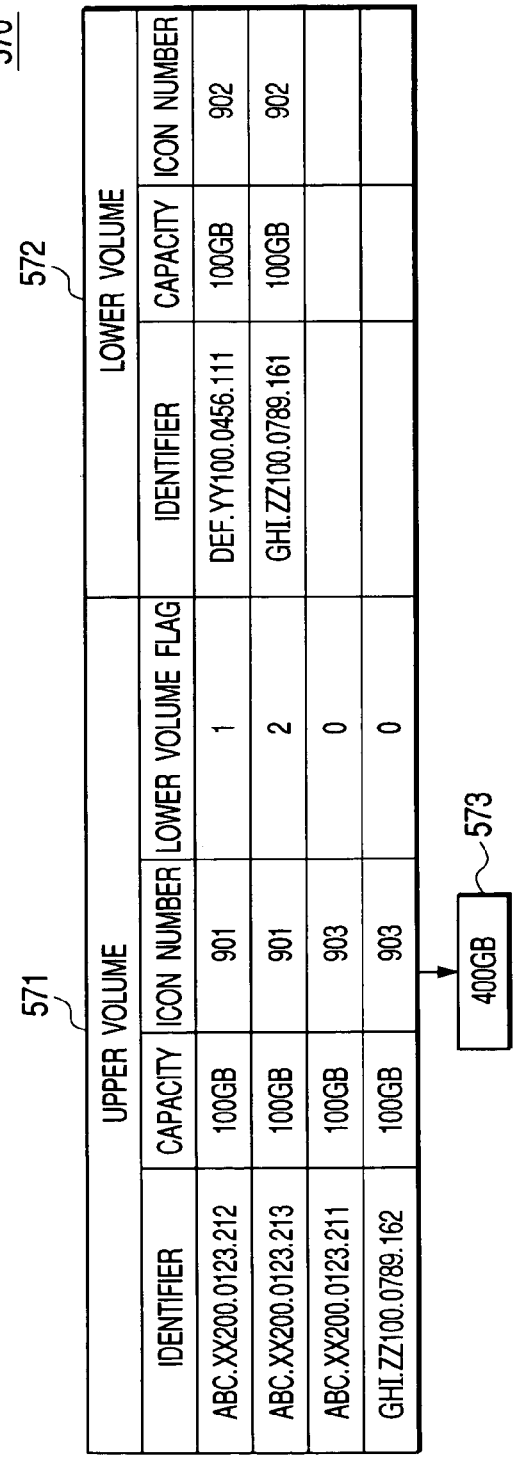
FIG. 6 shows the format of the consolidated information table according to a preferred embodiment.

The management computer 501 then composes a consolidated information table 570 shown in FIG. 6 based on the volume information and the hierarchy information thus collected, and stores it in its memory 513. The consolidated information table 570 consists of an upper-volume column 571 holding information on the higher-level volumes and a lower-volume column 572 holding information on the lower-level volumes.

The algorithm for composing the consolidated information table 570 is as follows.

First, the CPU 511 of the management computer 501 fetches the hierarchy information, and for each pair of volumes having a hierarchical relationship, registers their identifiers under their respective columns in the same row (1113). Further, in the icon number field of the column 571 of the same row, it puts "901," which means an icon indicating that the volume has a subordinate volume connected to it (1114); in the icon field of the column 572 of the same row, it puts "902," which means that the volume is subordinate to the upper-level volume (1114).

Next, the CPU 511 fetches the volume information and checks it row by row (1115). If the identifier corresponding to the selected row is already registered (1117), then it registers the capacity in the field next to the registered identifier (1121); otherwise (1117), it registers under the column 571 for a new row, the identifier, capacity, and icon number, which in this case is "903," meaning that it does not have any subordinate volume (1119).

The CPU 511 repeats the above process for all the volumes whose information has been obtained and for all the rows of the volume information table (1123, 1125, 1126, and 1127). If more than one piece of hierarchy information has been obtained, it will be reflected on the consolidated information table 570. FIG. 6 shows an example of the consolidated information table 570 which is composed of the volume information shown in FIG. 2 and the hierarchy information shown in FIG. 3. The total effective capacity to the computers in the system can therefore be calculated by adding up the values in the capacity column corresponding to upper-level volumes, which is 400 GB in this example (573).

The process of displaying the calculated capacity is now described below, with reference to FIG. 9.

Figures 9, 10:
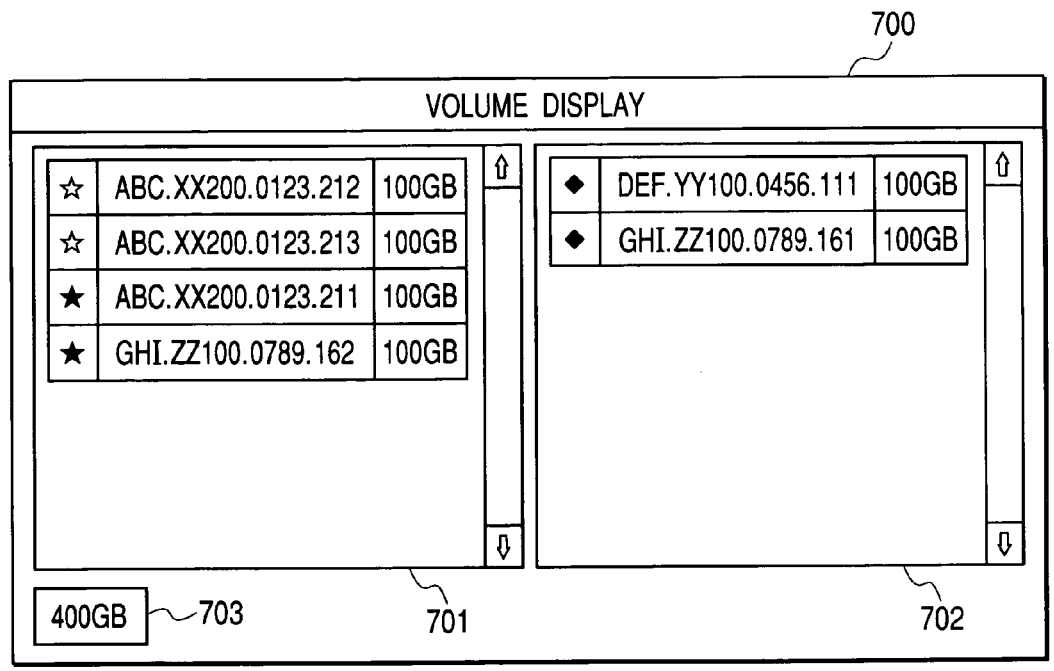
FIG. 9 shows an example of the display according to a preferred embodiment.
FIG. 10 shows the format of volume information according to another embodiment of the invention.

On the display 590 in the management computer 501, volume information and hierarchical information are displayed as shown in FIG. 9. The screen 700 is divided into three display sections 701 through 703. In the display section 701, the information in the upper-volume column 571 of the consolidated information table 570 is displayed. In the display section 702, the information in the lower-volume column 572 of the consolidated information table 570 is displayed. The hierarchical relationships are indicated by icons corresponding to the icon numbers registered in the icon number column ("901" through "903" in FIG. 6). In the display sections 701 and 702, the information displayed consists of, from left to right, the icon, the identifier, and the storage capacity. The display section 703 indicates the total effective capacity to the computers in the computer system. Use of characteristic icons with visually distinct figures and colors allows the system administrator to easily grasp on this screen the status of the volumes in the system at a glance.

To facilitate the viewing of volume and hierarchy information in a system having a large number of volumes, each display section may be provided with a scrolling feature.

By clicking the icon for a volume in the display section 701, it is possible to check whether there exists a volume hierarchically linked with that volume and, if yes, to locate the hierarchically linked volume. The CPU 511 consults the consolidated information table 570 and, if it finds a valid identifier registered in the corresponding row under the lower-volume column 572, highlights the corresponding entry in the display section 702, for example, by changing the color of the icon or the background of the identifier or framing the identifier. Similarly, when the icon for a volume in the display section 702 is clicked, the CPU 511 consults the consolidated information table 570 and, if it finds a valid identifier registered in the corresponding row under the upper-volume column 571, highlights the corresponding entry in the display section 701.

The present embodiment thus makes it possible, in a computer system in which volumes are hierarchically configured, to grasp the total effective capacity to a computer. Further, by dividing the screen on the display into two sections, i.e., one display section 701 for displaying information on the volumes used by the first-level storage unit 201 and the other display section 702 for displaying information on the other volumes, providing icons to represent the rank in hierarchy, and highlighting hierarchical relationships between pairs of volumes spanning the two display sections, it allows the system administrator to easily grasp the hierarchical relationships between volumes and the total effective capacity even when there exist hierarchical relationships between volumes.

Next, another preferred embodiment of the invention will be described with reference to diagrams.

This embodiment uses the same system configuration shown in FIG. 4 but uses formats of volume information and hierarchy information, as well as the display format on the display 590, different from those in the previous embodiment described so far.

The volume information has the format shown in FIG. 10. In response to a volume information request issued by the management computer 501, the storage unit 201, to which other storage units can be connected through the FC interface units 235, sends volume information of the format 247 shown in FIG. 10. The storage unit 101 and the storage unit 102 send volume information of the format 148 shown in FIG. 2(B) and the format 198 shown in FIG. 2(C), respectively, to the management computer 501. As in the previous preferred embodiment described above, the management computer 501 creates the consolidated information table 570 based on the volume information and the hierarchy information thus collected. In doing so, it relies on the lower volume flag shown in FIG. 10. The lower-volume flag indicates the hierarchical relationship between the pair of volumes in its row with three values. The value of "0" means that there is no subordinate volume (i.e., the real volume is contained solely in the first-level storage unit 201); the value of "1" means that the real volume is contained both the first-level storage unit and the second-level storage unit (i.e., they are synchronized by the data synchronization control module 238); the value of "2" means that the real volume is contained solely in the second-level storage unit. Thus, this embodiment is considered an expansion of the first preferred embodiment.

Figure 11A:
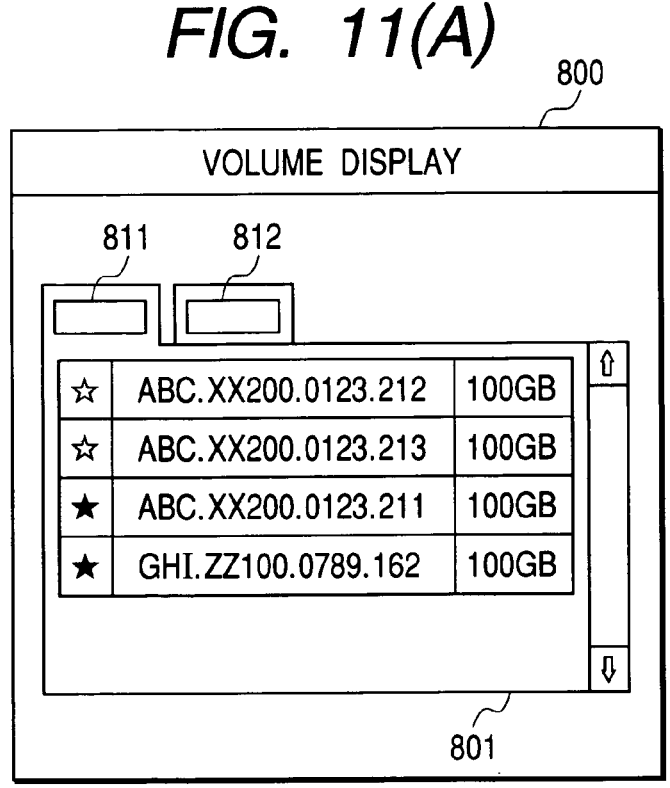
FIG. 11 shows an example of the display according to another embodiment.

On the display 590 in the management computer 501, a screen 800 shown in FIG. 11 is displayed. The screen 800 has two display sections 801 and 802 which are mutually exclusive. At any given time, either the display section 801 or the display section 802 is displayed. They are switched alternately by a tab 811 and a tab 812: when the tab 811 is clicked, the display section 801 appears on the screen 800; when the tab 812 is clicked, the display section 802 appears. Displayed in the display section 801 is the information in the column 571 of the consolidated information table 570 as shown in FIG. 11(A). The icon number in the consolidated information table 570 is replaced with the real icon corresponding to it.

Figure 11B:
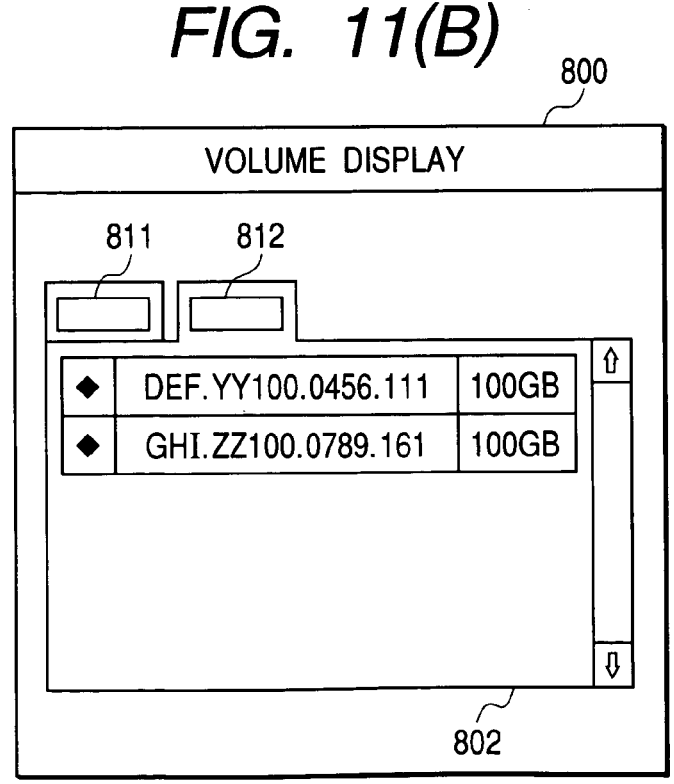

Displayed in the display section 802 is the information in the column 572 of the consolidated information table 570 as shown in FIG. 11(B). The icon number in the consolidated information table 570 is replaced with the real icon corresponding to it.

It is also possible to add a hiding feature such that the tab 812, and hence the display section 802, is hidden from certain administrators registered in the management computer. Such a feature can be used when certain administrators should be made unaware of the hierarchical relationships between volumes.

Figure 12A:
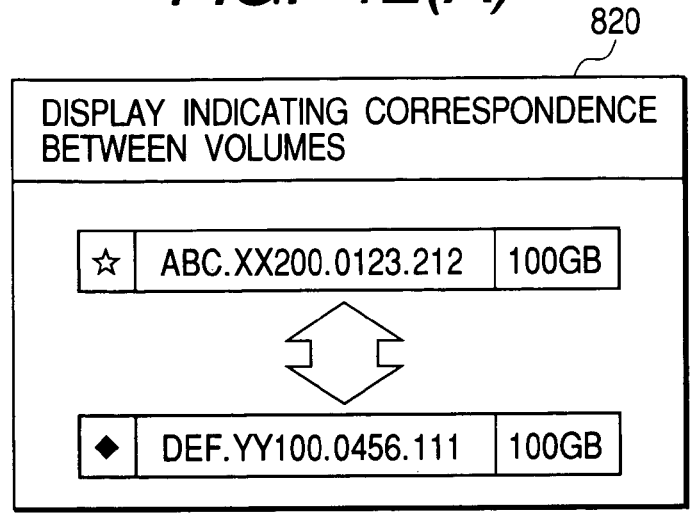
FIG. 12 shows an example of the display according to still another embodiment.
Figure 12B:
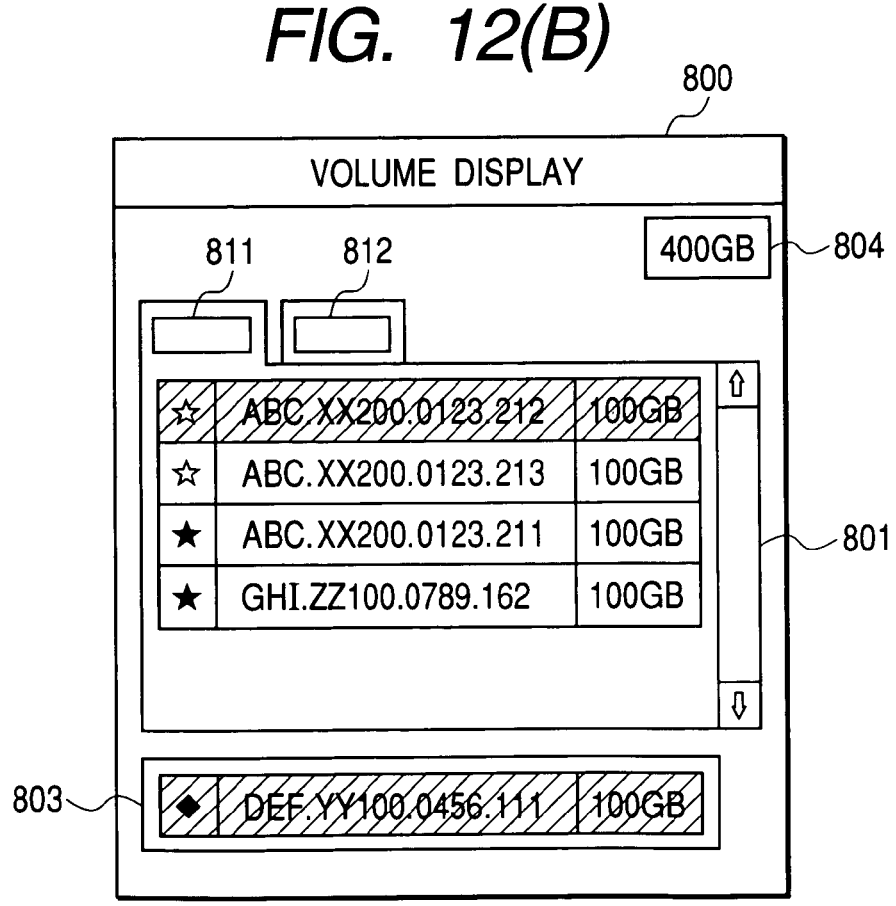

Other ways of volume information display can also be envisaged. For example, by clicking an icon in the display section 801 it is possible to check whether a subordinate volume exists. If a lookup of the consolidated information table 570 indicates that a valid identifier is found in the same row in the lower-volume column 572, then a subordinate window 820 appears on the display 590, displaying the information on the corresponding subordinate volume, as shown in FIG. 12(A). Alternatively, the information on the corresponding subordinate volume is displayed in a separate display area 803 of the screen 800 as shown in FIG. 12(B). In FIG. 12(B), the two areas that are hierarchically linked are highlighted using shading. In a display area 804, the total effective capacity to the computers in the system is indicated.

A number of other variations of embodiments can also be envisioned. For example, whereas FIG. 4 assumed that the identifier management computer 601 is independent of the management computer 501, these two computers may also be consolidated in one computer, in which case the identifier format request processing program 620 and the identifier format table 650 are stored in the memory 513 in the management computer 501.

A number of embodiments of the present invention have been described. Nevertheless, it should be understood that various modifications may be made without departing from the spirit and scope of the invention, and accordingly that the invention is not limited by the specific illustrated embodiments but only by the scope of the appended claims.

What we claim is:

1. A computer system comprising a computer, a plurality of storage units each containing one or more volumes for storing data used by the computer, and a management computer for managing the status of the plurality of storage units, comprising:

one or more first-level storage units each containing one or more first volumes, each of said first volumes being a target volume of an access sent from the computer via a fibre channel interface, and said one or more first volumes having at least one virtual volume, a plurality of second-level storage units, each of which is connected through a fibre channel network to, and hierarchically linked to, one of the first-level storage units, said second-level storage units containing one or more second volumes, wherein each of said second volumes can be a target volume of an access sent from the computer via a fibre channel interface, wherein said one or more first-level storage units are arranged to receive data access requests from said computer to said virtual volume, and to relay said data access requests to at least one of said second volumes based on a relationship between said virtual volume and said at least one second volume that corresponds to said virtual volume, such that said virtual volume as accessed by said computer is transparent as to its relationship to said at least one second volume, volume information collecting means for collecting volume information on the total capacity of each of said first and second volumes contained in the first-level and the second-level storage units, respectively, virtualization information collecting means for collecting virtualization information on the relationships between said virtual volume and said at least one second volume, and effective capacity calculating means for calculating the total effective capacity of the volumes of the first-level and second-level storage units based on subtracting the capacity of the virtual volume from the total capacity of said first and second volumes by using the volume information and the virtualization information thus collected.

2. The computer system of claim 1, wherein the first-level storage units and the second-level storage units each contain one or more virtual storage areas as virtual volumes, and the management computer comprises the volume information collecting means, the virtualization information collecting means, and the effective capacity calculating means.

3. The computer system of claim 1, wherein each of the first-level storage units comprises means for storing the virtualization information on the relationships between virtual volumes contained therein and volumes contained in the second-level storage units.

4. The computer system of claim 1, wherein the volume information collected by the volume information collecting means includes at least an identifier and information on the capacity of each volume contained in the first-level and the second-level storage units, each said identifier being formatted according to an identifier format provided by said management computer.

5. The computer system of claim 1, wherein the virtualization information collected by the virtualization information collecting means includes information indicating the relationship between an identifier of each virtual volume contained in the first-level storage units and an identifier of its hierarchically-linked at least one second volume contained in the second-level storage units.

6. The computer system of claim 1, wherein the management computer comprises a display for displaying the volume information collected by the volume information collecting means and the result of the calculation made by the effective capacity calculating means.

7. The computer system of claim 1, wherein the management computer comprises a display that has a first display section for displaying the volume information of the at least one second volume that is hierarchically linked to the at least one virtual volume contained in the first-level storage units, and a second display section for displaying the volume information of other volumes.

8. The computer system of claim 1, further comprising an identifier management computer for managing the formats of identifiers of the volumes of the first-level and second-level storage units, wherein each of the first-level and the second-level storage units comprises means for inquiring the identifier format of the identifier management computer and means for composing the volume information and the virtualization information in accordance with the identifier format held in the identifier management computer.

9. The computer system of claim 1, further comprising an identifier management computer connected through the fibre channel network to the one or more first-level storage units, the one or more second-level storage units, and the management computer, wherein the identifier management computer stores in a memory located therein, and manages, identifiers for identifying the volumes of the first-level and the second-level storage units in a standardized format, and upon receiving a request for identifier format information from one of the first-level or the second-level storage units or the management computer, retrieves the requested identifier format information from the memory, and sends the requested identifier format information to the first-level storage unit, the second-level storage unit, or the management computer requesting it.

10. A management computer for managing the status of storage units containing volumes for storing date used by a computer, comprising:

volume information collecting means for collecting volume information on the total capacity of first volumes from one or more first-level storage units containing said first volumes, each of said first volumes being a target volume of an access sent from the computer via a fibre channel interface, and said one or more first volumes having at least one virtual volume, and on the total capacity of second volumes from one or more second-level storage units, each of which is connected through a fibre channel network to, and hierarchically linked to, one of the first-level storage units, said one or more second-level storage units containing at least one second volume, wherein each of said second volumes can be a target volume of an access sent from the computer via a fibre channel interface, wherein said one or more first-level storage units are arranged to receive data access requests from said computer to said virtual volume contained in said one or more first-level storage units, and to relay said data access requests to said at least one second volume based on a relationship between said virtual volume and said at least one second volume that corresponds to said virtual volume, such that said at least one virtual volume as accessed by said computer is transparent as to its relationship to said at least one second volume, virtualization information collecting means for collecting virtualization information on the relationships between said virtual volume and said at least one second volume; and effective capacity calculating means for calculating the total effective capacity of the volumes of the first-level and second-level storage units based on subtracting the capacity of the virtual volume from the total capacity of said first and second volumes by using the volume information and the virtualization information thus collected.

11. The management computer of claim 10, further comprising a display for displaying the volume infoimation collected by the volume information collecting means and the result of the calculation made by the effective capacity calculating means.

12. The management computer of claim 11, wherein on the display either a screen where information on said at least one second volume that is hierarchically linked to the virtual volume is hidden or a screen showing information on volumes in the second-level storage units that are not hierarchically linked to volumes in the first-level storage units is selectively displayed.

13. The management computer of claim 10, further comprising a display for displaying information on the virtual volume made available to the computer, and an input device for inputting information on volumes, wherein information on volumes is displayed on the display as objects, and when a specific object on the display is selected by the input device, the corresponding second volume in the second-level storage unit located through the virtualization information will be identified, and the corresponding volume information obtained by the volume information collecting means from the corresponding second volume will be displayed on the display.

14. The management computer of claim 10, further comprising a display equipped with a screen having a first display section for displaying information on the at least one second volume that is hierarchically linked to the virtual volume, and a second display section for displaying information on other volumes.

15. The management computer of claim 10, further comprising a display for displaying as objects volume information of the first volumes in the first-level storage units collected by the volume information collecting means, wherein a first object indicating that the virtual volume in said one or more first-level storage units is actually provided by one of said at least one second volume in said one or more second-level storage units hierarchically linked thereto, and a second object representing the second volume that is actually provided as the virtual volume, are displayed on the display in such a way as to reflect the hierarchical relationship between them.

16. A management method for managing, using a management computer, capacities of volumes storing data used by a computer, comprising the steps of:

providing one or more first volumes in a first storage unit, each of said first volumes being a target volume of an access sent from the computer via a fibre channel interface, and said one or more first volumes having at least one virtual volume, establishing a hierarchical relationship between the first storage unit and a second storage unit that allows one or more second volumes in said second storage unit to be a target volume of an access sent from the computer via a fibre channel interface, wherein said second storage unit is connected through a fibre channel network to, and hierarchically linked to, the first storage unit, collecting from the first storage unit volume information on the total capacity of the first volumes contained therein, collecting from the second storage unit volume information on the total capacity of the second volumes contained therein, wherein said first storage unit is arranged to receive data access requests from said computer to said virtual volume, and to relay said data access requests to at least one of said second volumes based on a relationship between said virtual volume and said at least one second volume that corresponds to said virtual volume, such that said virtual volume as accessed by said computer is transparent as to its relationship to said at least one second volume, collecting virtualization information on the relationship between said virtual volume and said at least one second volume, and calculating the total effective capacity of the volumes of the first and second storage units based on subtracting the capacity of the virtual volume from the total capacity of the first and second volumes by using the volume information of the first and second volumes and the virtualization information.

17. The management method of claim 16, further comprising a step of displaying on a display the collected volume information on the first and second volumes and the calculated total effective capacity.

18. The management method of claim 17, wherein a screen of the display has a first display section for displaying the identifier, capacity, and associated icon of each volume of the first storage unit; a sceond display section for displaying the identifier, capacity, and associated icon of each volume of the second storage unit; and a third display section for displaying the total effective capacity.

19. The management method of claim 16, further comprising
a step of registering in a memory, and managing, identifier format information for identifying volumes of the first storage unit and the second storage unit in a standardized format, wherein
the management computer, when started up, retrieves the identifier format information from the memory, and, when collecting from the first and second storage units volume information on the volumes contained therein, and when collecting virtualization information on the relationships therebetween, obtains the information thus collected based on the identifier format information.

20. The management method of claim 19, wherein the identifier format information that is registered and managed includes at least the vendor name, the model name, and the volume number of the volume of the first or second storage unit so identified.

21. A storage medium on which is stored a program designed to run on a management computer for managing the storage capacities of storage units containing volumes for storing data used by a computer, the program when executed causing the management computer to perform a method comprising the steps of:
collecting from a first storage unit volume information on the total capacity of first volumes contained therein,
collecting from a second storage unit, having a hierarchical relationship with the first storage unit, volume information on the total capacity of second volumes contained therein, wherein said second storage unit is connected through a fibre channel network to, and hierarchically linked to, the first storage unit, and wherein said hierarchical relationship allows one or more second volumes in said second storage unit to be a target volume of an access sent from the computer via a fibre channel interface, wherein said second storage unit is connected through a fibre channel network to, and hierarchically linked to, the first storage unit,
collecting virtualization information on the relationships between said virtual volume and said at least one second volume, and
calculating the total effective capacity of the volumes of the first and second storage units based on subtracting the capacity of the virtual volume from the total capacity of the first and second volumes by using the volume information of the first and second volumes and the virtualization information,
wherein said first storage unit is arranged to receive data access requests from said computer to said virtual volume, and to relay said data access requests to at least one of said second volumes based on a relationship between said virtual volume and said at least one second volume that corresponds to said virtual volume, such that said virtual volume as accessed by said computer is transparent as to its relationship to said at least one second volume.

22. In a computer system including one or more first-level storage units each containing one or more first volumes for storing data used by a computer, a plurality of second-level storage units each of which is connected through a fibre channel network to, and hierarchically linked to, one of the first-level storage units, said second-level storage units containing one or more second volumes, and a management computer for managing the status of the volumes contained in the first-level and the second-level storage units, a management method for managing the volumes contained in the first-level and the second-level storage units comprising:
providing one or more first volumes in the one or more first-level storage units, each of said first volumes being a target volume of an access sent from the computer via a fibre channel interface, and said one or more first volumes having at least one virtual volume,
establishing a hierarchical relationship between one of the first-level storage units and one of the second-level storage units that allows one or more second volumes in said one of the second-level storage units to be a target volume of an access sent from the computer via a fibre channel interface, wherein said one of the second-level storage units is connected through a fibre channel network to, and hierarchically linked to, one of the first-level storage units,
wherein said one of the first-level storage units is arranged to receive data access requests from said computer to said virtual volume, and to relay said data access requests to at least one of said second volumes based on a relationship between said virtual volume and said at least one second volume that corresponds to said virtual volume, such that said virtual volume as accessed by said computer is transparent as to its relationship to said at least one second volume,
storing in a memory, located in each of the first-level and the second-level storage units, identifier format information in a standardized format for identifying volumes of the first-level and the second-level storage units, respectively,
issuing a request for volume information from the management computer to the first-level and the second-level storage units, said volume information including volume information on the total capacity of the first volumes of the first-level storage units and volume information on the total capacity of second volumes of the second-level storage units,
consulting the identifier format information stored in the memory in each of the first-level and the second-level storage units upon receiving the request for volume information, and sending to the management computer the volume information including the number of volumes contained in it, their identifiers and their total capacities in the format specified in the identifier format information,
issuing a request for inter-volume virtualization information from the management computer to the first-level and the second-level storage units, said virtualization information identifying which volumes of said second-level storage units and said first-level storage units are hierarchically linked together,
consulting the identifier format information stored in the memory in each of the first-level and the second-level storage units, upon receiving the request for inter-volume virtualization information, and sending to the management computer the inter-volume virtualization information contained therein in the format specified in the identifier format information, composing, based on the volume information and the inter-volume virtualization information, a consolidated information table including an upper-volume column containing the identifier, capacity, icon number, and a flag indicating the existence of subordinate volumes for each volume belonging to the higher level of hierarchy; and a lower-volume column containing the identifier, capacity, and icon number for each volume belonging to the lower level of hierarchy in the management computer, registering the consolidated information table in a memory, and displaying the contents of the consolidated information table retrieved from the memory in at least three display sections of the display; a first display section for displaying the identifiers, capacities, and associated icons of the volumes belonging to the higher level of hierarchy; a second display section for displaying the identifiers, capacities, and associated icons of the volumes belonging to the lower level of hierarchy; and a third display section for displaying the total available capacity of the volumes of the first-level and second-level storage units based on subtracting the capacity of the virtual volume from the total capacity of the first and second volumes by using the volume information and the virtualization information.

23. A management computer for managing the status of storage units containing volumes for storing data used by a computer, comprising:

a CPU and a fibre channel network interface connected by a management network, wherein the CPU collects volume information on the volumes from one or more first-level storage units containing first volumes and from one or more second-level storage units each of which is connected through a fibre channel network to, and hierarchically linked to, one of the first-level storage units, each of said first volumes being a target volume of an access sent from the computer via a fibre channel interface, and said one or more first volumes having at least one virtual volume; said one or more second-level storage units containing at least one second volume, and collects virtualization information on the relationships between said virtual volume and said at least one second volume via said fibre channel network interface, wherein each of said second volumes can be a target volume of an access sent from the computer via a fibre channel interface, wherein said one or more first-level storage units are arranged to receive data access requests from said computer to said virtual volume, and to relay said data access requests to at least one of said second volumes based on a relationship between said virtual volume and said at least one second volume that corresponds to said virtual volume, such that said virtual volume as accessed by said computer is transparent as to its relationship to said at least one second volume, wherein said virtualization information identifies which volumes of said second-level storage units and said first-level storage units are hierarchically linked together, and wherein said CPU calculates the total effective capacity of the volumes of the first-level and second-level storage units based on subtracting the capacity of the virtual volume from the total capacity of said first and second volumes by using the volume information and the virtualization information thus collected.

24. The management computer of claim 23, further comprising a display for displaying the volume information and virtualization information collected by said CPU, and the result of the total effective capacity calculation by said CPU.

* * * * *